April 18, 1961 E. S. GWATHMEY 2,979,948
FLUID FLOW METER
Filed Dec. 24, 1958

INVENTOR.
Edward S. Gwathmey

United States Patent Office 2,979,948
Patented Apr. 18, 1961

2,979,948

FLUID FLOW METER

Edward S. Gwathmey, Earlysville, Va., assignor to Specialties, Incorporated, Syosset, N.Y., a corporation of New York Filed Dec. 24, 1958, Ser. No. 782,831

4 Claims. (Cl. 73—228)

This invention relates to instruments generally and has especial reference to fluid flow meters for general use and associated devices such as rate of climb indicators for aircraft. Fluid flow meters may be used for measuring velocities of air in wind tunnels, for measuring flow of fluids in industrial installations, for indicating velocities of winds, rivers, and for many other purposes.

Rate of climb indicators are known but there has been difficulty in compensating these devices for temperature changes, among other problems like the decrease of viscosity of the atmosphere with fall of temperature. In addition, prior rate of climb indicators, flow meters and the like have needed improvement in the resilient elements like springs, for restoring the pointers or indicators to zero position under normal conditions. Springs have temperature factors and often lose resiliency and calibration with aging, besides being of delicate construction.

It is therefore an object to provide a fluid flow meter which is rugged and reliable, having few delicate parts which may be damaged or which may get out of adjustment.

Another object is to provide a rate of climb indicator for aircraft, having novel temperature compensation means.

A further object is to provide a fluid flow meter or rate of climb indicator which has no springs which may cause trouble.

An additional object is to provide a fluid flow meter which can be readily calibrated.

A still further object is to provide a fluid flow meter or rate of climb indicator which can be easily adjusted to produce varied degrees of scale indications for predetermined values of rate of climb.

Other objects will be evident in the following description.

Figure 1:
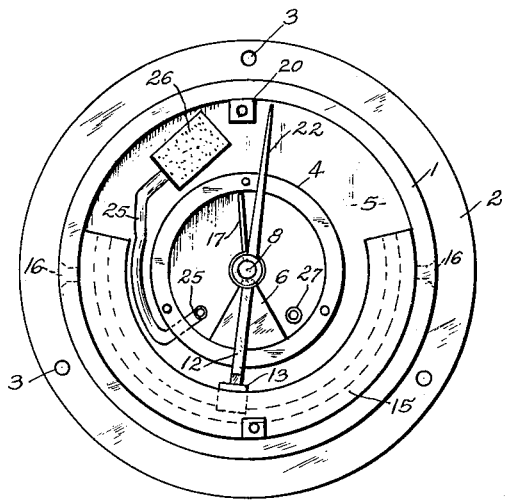
Figure 1 is a front elevation, with covers removed, of a rate of climb indicator or fluid flow meter having novel temperature compensation means and magnetic means which may be used in place of or in conjunction with a spring.
Figure 2:
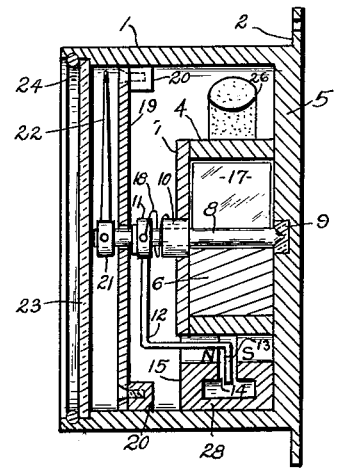
Figure 2 is a left side elevation, in part section, of the device shown in Figure 1.

In Figures 1 and 2, circular casing member 1 is integral with flange 2 which has holes 3 for mounting on a panel or other support. Inner cylinder 4 rises from base plate 5 and may be integral with or attached to this plate. Solid wedge 6 rises from the end or floor of cylinder 4 and extends to circular cover plate 7 for cylinder 4, as shown particularly in Figure 2. The centrally located edge of the wedge 6 is curved to conform to the cylindrical shape of shaft 8 but it is slightly spaced from this shaft. This shaft is rotatable in bearing 9 fastened in a recess in base or rear wall 5, and in bearing 10 fastened in a central opening in cover plate 7 which is attached to the edge of cylinder 4 by means of screws. Cover plate 7 may be axially aligned by means of dowel pins or by means of a shoulder on the plate. Such construction is well known.

The bearing 9 may be a jewel or of any suitable type as may bearing 10. Collar 11 is fastened around shaft 8 and carries attached bent arm 12 which has integral or attached iron or steel plate 13 which is movable in the circular slot 14 between the North and South poles of permanent magnet 15 which may be fastened in desired position by means of diametrically opposed screws 16 although other fastening and adjusting means could be used. By means of this arrangement the magnet 15, which is circularly curved to fit the inner surface of casing 1, can be angularly shifted for calibration purposes.

Vane 17 is fastened to shaft 8 in radial alignment, by means of welding, or by slotting the shaft, or in other manner. This vane is designed so that there are narrow air gaps between the edges of the vane and adjacent surfaces of members 5, 4, and 7. Spiral or torsion spring 18 is attached to collar 11 and to cover plate 7 and serves to bias shaft 8 to rotate to zero position under conditions of steady pressure, or no change of altitude. This spring may be used in conjunction with magnet 15 or it may be omitted, using the magnet alone. In case the spring is used it can be of light construction.

Shaft 8 passes through a central hole in disc 19 which is fastened to lugs 20, extending from casing 1, by means of screws. Collar 21, carrying pointer 22, is fastened to the front end portion of shaft 8 and is movable over a suitable scale on disc 19. If the device is a rate of climb indicator the pointer should normally be in register with a zero mark and calibrated values of rate of climb for either ascent or descent should be indicated on the scale. Scales of this type are known. The pointer 22 and vane 17 should be balanced with respect to the generally oppositely positioned arm 12 and plate 13. Glass or transparent plastic disc 23 is pressed against a shoulder in casing 1 by means of expansible retaining ring 24 which is held in a suitable groove.

Small tube 25 passes through cylindrical wall 4 near wedge 6 and is curved as indicated to fit into available space. The other end of this tube leads into cylinder 26 of porous ceramic or other suitable flow-restricting material. This porous cylinder may be placed in the instrument as indicated or it may be located outside of the casing. Air supply tube 27 is closely fitted in a hole in plate 5 and is located adjacent to the other plane face of wedge 6. This tube leads out to the atmosphere. If the aircraft is not pressurized then the tube 27 could comprise a hole in wall or plate 5.

The magnet 15 has circularly shaped N and S poles as indicated, joined by similarly shaped wall 28 for passing flux. The width of the air gap 14 is tapered from a relatively close gap for the zero position of element 13 and pointer 22 to a relatively wide gap for maximum scale indication. The magnetizable or magnetic plate 13 will seek the strongest magnetic flux and will therefore be urged to turn, to the narrowest part of the air gap. When the device is used as a rate of climb indicator in which the pointer should show either rate of climb or rate of descent, the narrowest part of the air gap will be in the central portion of the magnet, tapering toward the widest gaps at each end of the magnet.

In order to compensate for temperature variations, I make the vane 17 of metal or other material of less temperature coefficient of expansion than the material of cylinder 4. In this way the air gap around the effective periphery of vane 17 will be reduced for a lowered temperature, to compensate for the decreased viscosity of the air or atmosphere when the temperature is lowered. On the contrary, when the temperature rises the material of cylinder 4 will expand faster than the material of vane 17 and so the air gap will be increased to compensate for the increased viscosity of the air with higher temperature. The cover plate or disc 7 may be made of the same material as cylinder 4 or of different material. The various parts may be made of metals or the vane 17 may be made of a plastic such as Bakelite and the cylinder 4 may be of steel, brass, or other metal. The particular materials chosen for temperature compensation will depend upon the temperature ranges involved and the degree of compensation desired. As one illustration of specific metals which could be used, the cylinder 4 could be made of aluminum or aluminum alloy and vane 17 could be of steel, nickel, or other metal of less temperature coefficient of expansion.

Change of temperature of the material of plate 5 will change the effective diameter of cylinder 4 and will change the effective length of cylinder 4, if attached. By properly proportioning the diameter of this cylinder with respect to its length, various predetermined temperature compensation effects can be achieved, especially when employed in conjunction with a choice of materials. The air gap between the outer edge of vane 17, parallel with the axis and cylinder 4 is affected by the expansion or contraction of plate 5 with change of temperature and the air gaps between the radially aligned parallel edges of element 17 and members 5 and 7 are affected by the lengthwise expansion and contraction of cylinder 4, considered in conjunction with the changes of dimension of element 17. It is preferable that the material of cylinder 4 be the same as the material of plate 5 in order to avoid temperature distortions. It will be noted that air flowing adjacent to cylinder 4 will have a greater torque effect than air flowing adjacent to plates 5 and 7, due to the greater radius.

In operation, considering a rate of climb indicator, the device is installed in an aircraft and the atmospheric pressure is admitted into cylinder 4 on the right side of vane 17 through tube 27. Assuming that there is no change of altitude the same atmospheric pressure will be built up in porous cylinder 26 due to leakage of air past the vane 17 and through tube 25. If the aircraft suddenly rises the pressure to the right of vane 17 will be reduced and, due to the flow-restricting effect of porous cylinder 26 and the small air gaps adjacent the vane, the pressure to the left of the vane will be substantially the same as that before the increase of altitude. Therefore air will flow past the vane, and through the air gaps in a direction to exert clockwise torque on the vane and associated pointer and element 13. The latter element will be rotated in the air gap 14 of the magnet until the restoring magnetic pull of the varied-width gap field is equal to the opposing torque which is dependent upon the pressure differential, or in other words, upon the rate of climb. When the aircraft ceases to rise the pressure on both sides of the vane soon becomes the same and there is then no air flow through the gaps. The tapered strength magnetic field in gap 14 then causes element 13 and pointer 22 to return to zero position.

As previously stated, torsion spring 18 may also be used but is not necessary. The magnetic field restoring force can be varied very gradually and the magnitude of that force may be predetermined by varying the air gap according to the sensitivity desired at various angular locations of the pointer. By using the magnetic field the restoring torque can be made very delicate or rather strong, as desired, and the scale may be spread out at the ends or in any way preferred. This system is more flexible than one employing a spring which tends to build up torque rapidly with displacement. Adjustments of calibration can be made by loosening screws 16 and shifting magnet 15 one way or the other to bring the pointer to zero position.

The operation has been described for increasing altitude. If the aircraft lowers its altitude the increased pressure is communicated through tube 27 to the chamber to the right of vane 17 and accordingly air flows counter clockwise through the air gap adjacent the vane, since the pressure in porous cylinder 26 and the space directly connected with tube 25 temporarily remains that of the previous higher altitude. The pressure is soon equalized in the porous cylinder and the chambers by flow past the vane, after the aicraft levels out at the lower altitude. In this case the vane and pointer are displaced in an opposite direction from the previous direction described.

Figure 3:
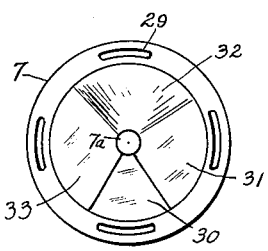
Figure 3 is a view of the inner rear surface of the cover plate for the air pressure chamber of the instrument shown in Figures 1 and 2.

Figure 3 shows an inside view of a modified cover plate 7 for cylinder 4. In this case four fastening screws would be used and would be placed in curved slots 29. The cover can then be rotated through an angle for adjustment or calibration purposes. The area 30 is shaped to cover wedge 6 of Figure 1 and is flat to provide a sealing fit. The area 31 may be cut away slightly and the area 32 is shown as more deeply recessed. The area 33 may flush with area 30 or recessed to any desired degree. These areas may be of any desired contour and variation both as to extent and as to curvature. The purpose is to calibrate the instrument or to enlarge or expand portions of the scale by varying the effective torque acting on the vane 17 at various angular positions. This is done by varying the gap between the forward edge of the vane and the inner surface of cover plate 7. The inner surface of plate 5 could be contoured if desired.

Figure 4:
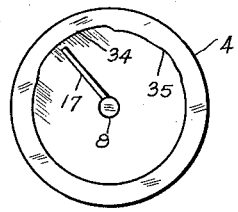
Figure 4 is a front elevation of a modified air pressure chamber for use with the device of Figure 1.

As shown in Figure 4, the air gap between the vane 17 and the inner surface of cylinder 4 can be varied for purposes above described by changing the radius of the cylinder as indicated at 34 and 35. Central hole 7a is provided for shaft 8 or bearing 10.

Figure 5:
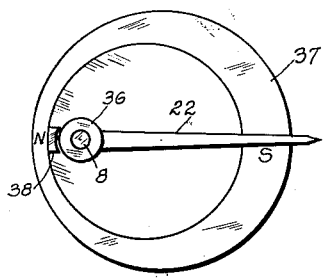
Figure 5 is a front elevation of a magnetic system for centering and controlling the pointer of instruments similar to that of Figure 1.

In Figure 5, the pointer 22 is of iron or steel and has similar hub or collar 36 which is fastened to shaft 8. This shaft, as before, carries a vane, not shown. Permanent magnet 37, tapered in width as indicated, is placed in the instrument beneath the pointer which should be of relatively stiff construction. The magnet has one pole N at the narrow part and the opposite pole S at the wide part of the magnet. Iron element 38 extends from the magnet and is curved to fit closely to shaft 8, a narrow air gap remaining between them. The magnetic flux path from one pole to the other will be completed through the pointer which will seek the position of greatest flux density shown. This can be taken as the zero position of the pointer and if it is angularly displaced by air pressure on the attached vane, there will be a restoring magnetic torque for either direction of displacement. The air gap between the magnet and the pointer may be progressively reduced from the N pole to the S pole, if desired. This will also cause the pointer to seek the zero position. No spring is necessary and the advantages are as previously described.

Figure 6:
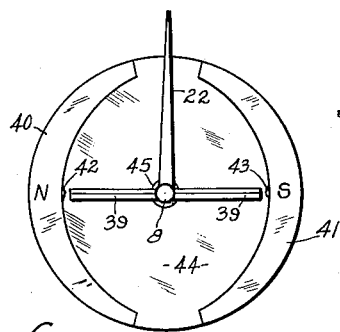
Figure 6 is a front elevation of a modification of the device shown in Figure 5, including a temperature compensating magnetic flux element.

Figure 6 shows another modified magnetic biasing system for the pointer structure. The pointer 22 is attached to shaft 8 which also has attached bimetal arms 39 each containing one member of iron or steel. The outer radii of poles 40 and 41 are concentric with the axis of shaft 8 which is mounted in the same manner as described in connection with Figures 1 and 2. Again, a suitable air operated vane is attached to this shaft but is not shown. The inner radii of elements 40 and 41 gradually increase from central buttons or ridges 42 and 43 to the ends of the elements or poles. These poles extend from base plate 44 of the same material. Shaft 8 passes through hole 45 in plate 44. The iron ridges 42 and 43 will furnish concentrations of magnetic flux so that iron or steel bar or plate 39 will normally be aligned as indicated, the magnetic flux between the N pole 40 and the S pole 41 traversing the bars 39. As elements 39 are rotated away from the zero position indicated by air pressure on the vane attached to shaft 8 but not shown, the air gaps between the ends of element 39 and the inner curved surfaces of the poles will continually increase, for either direction of displacement. Therefore the magnetic field will urge the bar and pointer to return to zero position or to the condition of minimum reluctance.

The radially directed magnetic flux passing through bar or bars 39 balances the forces so that a lighter and more sensitive construction can be used. The pointer and the elements 39 can be integral with or attached to an iron or steel collar fastened around shaft 8. If desired the poles 40 and 41 may be radially and angularly adjustable on plate 44, suitable slots and attaching screws being provided. This construction is convenient for calibration purposes, or the like. Temperature compensation may be provided as previously described, or the elements 39 may be made of bimetal or other heat-responsive metal so that the gaps between the ends of these elements and the magnet poles will be varied due to bending of elements 39 as a result of change of temperature. The temperature compensation may be designed to take care of any changes in magnetic field strength with change of temperature as well as change of viscosity of air. In case rotation of the pointer of 180 degrees or more is desired, for either direction, two double bars 39 may be used at different axial positions on shaft 8 and separate magnets may be used for each bar. These magnets may be of the same general design as magnet 15 in Figure 1.

Figure 7:
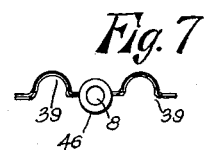
Figure 7 is a front elevation of a modification of the heat responsive magnetic flux element of Figure 6.

As shown in Figure 7, the bimetal elements 39 may be looped or bent in any desired manner to increase the degree of temperature responsiveness or to cause the ends of the elements 39 to move in more or less radial paths. The elements are shown attached to iron collar 46 which is fastened to shaft 8. The magnet poles 40 and 41 could of course be shifted by means of a heat-responsive member, in order to compensate for temperature change.

Numerous changes of detail or specific arrangements may easily be made without departing from the principles I have disclosed. For instance, the design of the magnets may be widely varied and the heat responsive element may be of any suitable type.

While a rate of climb indicator has been described primarily, it is contemplated that the device can also be used as a fluid flow meter in many industrial and other applications. The dynamic effect of fluid passing the vane can be employed with or without a flow restricting device like the porous cylinder and the temperature compensation means described, and the magnetic substitutes for springs, will be applicable to instruments of this type.

What I claim is:

1. In an instrument, a casing having a cylindrical inner surface, a magnet having a curved surface adjacent to said cylindrical inner surface and coaxial therewith, said magnet having two curved opposed pole pieces coaxial with said curved surface and a shorter radii than said surface, opposite curved faces of said pole pieces being separated by an air gap of gradually varied width, a magnetizable element movable in said air gap between said pole faces, means responsive to fluid flow in said casing and including a shaft rotatable through an angle, a vane attached to said shaft and rotated about the axis of said shaft by flow of said fluid, said shaft being coaxial with said cylindrical inner surface, means fastening said magnetizable element to said shaft, and indicator means attached to said shaft for measuring fluid flow relative to said vane.

2. The instrument as described in claim 1, and including means for fastening said magnet in various positions about the axis of said shaft.

3. The instrument as described in claim 1, said air gap gradually increasing in width in either direction from a predetermined portion of said magnet.

4. In an instrument, a casing having an inner surface area curved about an axis of revolution, a magnet with an outer member having a surface coaxial with said surface area and in contact with a portion thereof, a pair of spaced pole pieces extending toward said axis from said outer member and curved coaxially therewith, the air gap between effective faces of said pole pieces being of tapered width, a magnetizable element movable in said air gap around said axis, means responsive to fluid flow in said casing and including a shaft rotatable through an angle about said axis, and means attached to said shaft and supporting said magnetizable element for rotation therewith.

References Cited in the file of this patent

UNITED STATES PATENTS

| | | |
|---|---|---|
| 2,171,298 | Archbald | Aug. 29, 1939 |
| 2,283,311 | Bevins | May 19, 1942 |
| 2,294,282 | Cerstvik | Aug. 25, 1942 |
| 2,350,741 | Ford | June 6, 1944 |